US012804325B2

(12) United States Patent
Mefleh et al.

(10) Patent No.: US 12,804,325 B2
(45) Date of Patent: Nov. 17, 2026

(54) ELECTRODYNAMIC ACTUATOR WITH IMPROVED MAGNET SYSTEM

(71) Applicant: Sound Solutions International (Zhenjiang) Co., Ltd., Zhenjiang City (CN)

(72) Inventors: Manuel Mefleh, Vienna (AT); Michael Schoeffmann, Baden (AT)

(73) Assignee: Sound Solutions International (Zhenjiang) Co., Ltd., Zhenjiang City (CN)

( * ) Notice: Subject to any disclaimer, the term of this patent is extended or adjusted under 35 U.S.C. 154(b) by 134 days.

(21) Appl. No.: 18/769,328

(22) Filed: Jul. 10, 2024

(65) Prior Publication Data

US 2025/0030984 A1 Jan. 23, 2025

(30) Foreign Application Priority Data

Jul. 17, 2023 (AT) .............................. A 50571/2023

(51) Int. Cl.

*H04R 9/02* (2006.01)
*H04R 9/04* (2006.01)
*H04R 9/06* (2006.01)

(52) U.S. Cl.

CPC ............ *H04R 9/025* (2013.01); *H04R 9/045* (2013.01); *H04R 9/046* (2013.01); *H04R 9/06* (2013.01); *H04R 2400/07* (2013.01)

(58) Field of Classification Search

CPC ...... H04R 9/066; H04R 1/00; H04R 2440/01; H04R 2499/15; H04R 9/06; H04R 9/046;

(Continued)

(56) References Cited

U.S. PATENT DOCUMENTS 6,377,145 B1 4/2002 Kumagai
6,850,138 B1 2/2005 Sakai (Continued)

FOREIGN PATENT DOCUMENTS

GB 2508763 A 6/2014
JP 2000316268 A 11/2000

OTHER PUBLICATIONS

First Office Action and search report in counterpart AT pat. appl. no. A 50571/2023 Feb. 15, 2024.

*Primary Examiner* — Carolyn R Edwards
*Assistant Examiner* — Julie X Dang
(74) *Attorney, Agent, or Firm* — Dykema Gossett PLLC

(57) ABSTRACT

An electrodynamic actuator (2*a* . . . 2*l*) is disclosed, which is designed to be connected to a sound emanating structure (3) and which comprises a coil arrangement (4) with at least one voice coil (5, 6) and a magnet system (7*a*, 7*l*), comprising an annular peripheral magnet system part (8*a*, 8*l*) and a center magnet system part (9*a*, 9*l*) with the coil arrangement (4) in-between. Further on, the electrodynamic actuator (2*a* . . . 2*l*) comprises a spring arrangement (15), which couples the peripheral magnet system part (8*a*, 8*l*) to the center magnet system part (9*a*, 9*l*) and allows a relative movement between the same in an excursion direction parallel to a coil axis (C). The center magnet system part (9*a*, 9*l*) comprises a center magnet (11) and at least one plate (12*a* . . . 13*l*) adjoining said center magnet (9*a*, 9*l*) in the excursion direction, wherein the at least one plate (12*a* . . . 13*l*) comprises a collar (14*a* . . . 14*l*') on its outer edge, which faces away from the center magnet (11). Additionally, an electrodynamic transducer (1) with such an electrodynamic actuator (1*a* . . . 1*f*) is disclosed.

20 Claims, 6 Drawing Sheets

(58) Field of Classification Search
CPC .......... H04R 9/00; H04R 9/045; H04R 1/028; H04R 9/025; F16F 1/021; F16F 1/027; F16F 1/326; G06F 1/1605; G06F 3/16; G10K 9/13; H02K 41/0354; H02K 41/0356
USPC .......................... 381/400–410, 412, 419, 420
See application file for complete search history.

(56) References Cited

U.S. PATENT DOCUMENTS

| | | | | |
|---|---|---|---|---|
| 8,958,596 | B2 * | 2/2015 | Chu | H04R 9/022 381/397 |
| 2003/0227225 | A1 | 12/2003 | Kaneda | |
| 2004/0170297 | A1 | 9/2004 | Hikichi | |
| 2010/0296689 | A1 | 11/2010 | Pircaro | |
| 2014/0241566 | A1 * | 8/2014 | Choi | H04R 9/043 381/400 |
| 2016/0127834 | A1 | 5/2016 | Kim | |
| 2018/0115830 | A1 | 4/2018 | Salvatti | |
| 2018/0192217 | A1 | 7/2018 | Hogan | |
| 2018/0367918 | A1 | 12/2018 | Salvatti | |
| 2019/0253805 | A1 | 8/2019 | Wakeland | |
| 2020/0045434 | A1 * | 2/2020 | Zhou | H04R 9/06 |
| 2021/0020153 | A1 | 1/2021 | Reining | |
| 2021/0021933 | A1 * | 1/2021 | Otto | G10K 9/13 |
| 2021/0368276 | A1 | 11/2021 | Otto | |
| 2021/0368277 | A1 | 11/2021 | Otto | |
| 2022/0232326 | A1 | 7/2022 | Heidinger | |
| 2024/0080626 | A1 * | 3/2024 | Shi | H04R 9/025 |

* cited by examiner

ELECTRODYNAMIC ACTUATOR WITH IMPROVED MAGNET SYSTEM

PRIORITY

This patent application claims priority from Austrian patent application No. A 50571/2023, filed Jul. 17, 2023, entitled, "Electrodynamic Actuator with Improved Magnet System," the disclosure of which is incorporated herein, in its entirety, by reference.

BACKGROUND

The invention relates to an electrodynamic actuator, which is designed to be connected to a sound emanating structure and which comprises a coil arrangement with at least one voice coil and a magnet system with an annular peripheral magnet system part and a center magnet system part with the coil arrangement in-between. The at least one voice coil has an electrical conductor in the shape of loops running around a coil axis in a loop section, and the magnet system is designed to generate a magnetic field transverse to the conductor in the loop section. Furthermore, the electrodynamic actuator comprises a spring arrangement, which couples the peripheral magnet system part to the center magnet system part and which allows a relative movement between the peripheral magnet system part and said center magnet system part in an excursion direction parallel to the coil axis. The center magnet system part comprises a center magnet and at least one plate adjoining said center magnet in the excursion direction. Moreover, the invention relates to an electrodynamic transducer, comprising a sound emanating structure and an electrodynamic actuator of the above kind, which is connected to the sound emanating structure.

An electrodynamic actuator and an electrodynamic transducer of the aforementioned kinds are generally known in prior art. Often, a center magnet system part comprises the center magnet and a first plate or top plate adjoining said center magnet above in the excursion direction and a second plate or bottom plate adjoining said center magnet below in the excursion direction to guide the magnetic flux generated by the center magnet. Commonly, the plates are simply cut out or punched out of a sheet material what is easy to produce but what however leads to some drawbacks:

First, the flux density in and the magnetic resistance of the air gap, which the at least one coil is arranged in, are inverse proportional to the height of the at least one plate what also means that the flux density and the magnetic resistance are inverse proportional to the mass of the at least one plate. Because the center magnet system part often is the moving magnet part, this also means that the flux density and the magnetic resistance influence the oscillation behavior of the center magnet system part. In other words, reducing the flux density and the magnetic resistance leads to increased mass of the center magnet system part and thus to poor high frequency response of the electrodynamic actuator in its application and to unwanted lowering of the resonance frequency.

Second, it should be noted that the magnetic resistance or reluctance acts as a kind of a "magnetic spring" because the magnetic system tends to move into a position, in which the absolute value of the magnetic resistance or reluctance reaches a minimum. In turn, this also means that the height of the at least one plate influences the idle position of the magnetic system. In other words, shifting the idle position by changing the height of the at least one plate again goes hand in hand with a changed mass of the moving center magnet system part.

Third, the height of the at least one plate influences the maximum operating excursion. The thicker the plate is, the higher is the maximum operating excursion. In other words, increasing the maximum operating excursion again leads to increased mass of the center magnet system part and thus to poor high frequency response of the electrodynamic actuator.

Finally, the height of the at least one plate also influences the maximum excessive excursion before a further movement of the center magnet system part is mechanically blocked by another part of the electrodynamic actuator. This maximum excessive excursion is not caused by normal operation but by external excessive acceleration, for example when the electrodynamic actuator or the device, which the electrodynamic actuator is built into, falls to the ground. Excessive excursion may damage the electrodynamic actuator, in particular the spring arrangement, which often is rather filigree. To reduce the maximum excessive excursion, one could have the idea to increase the height of the at least one plate what, as was explained above, again leads to increased mass of the center magnet system part and thus poor high frequency response of the electrodynamic actuator.

SUMMARY OF THE INVENTION

Accordingly, it is an object of the invention to overcome the drawbacks of the prior art and to provide an improved electrodynamic actuator and an improved electrodynamic transducer. In particular, the aforementioned parameters of the electrodynamic actuator shall be made invariant or substantially invariant of the mass of the center magnet system part thus improving design freedom for the electrodynamic actuator.

The problem of the invention is solved by an electrodynamic actuator as defined in the opening paragraph, wherein the at least one plate comprises a collar on its outer edge (or a raised edge area respectively), which faces away from the center magnet in the excursion direction.

The problem of the invention is also solved by an electrodynamic (acoustic) transducer, which comprises a sound emanating structure and an electrodynamic actuator of the above kind, which is connected to the sound emanating structure. For example, the sound emanating structure can be embodied as a membrane, as a display or as a housing part of a device, which the electrodynamic actuator is built into. In the latter case, a device is formed, which comprises a housing and an electrodynamic actuator of the aforementioned kind, which is connected to the housing, wherein the housing forms a sound emanating structure. In particular, the electrodynamic actuator can be mounted to the backside of sound emanating structure opposite to a sound emanating surface of the sound emanating structure, wherein said backside is oriented perpendicularly to the coil axis.

By use of the proposed measures, the drawbacks of the prior art are overcome. For example, the flux density in and the magnetic resistance of the air gap, which the at least one coil is arranged in, are no longer inverse proportional to the mass of the at least one plate, which contributes to the mass of the center magnet system part and which influences the frequency response of the electrodynamic actuator. Advantageously, magnetic saturation of the at least one plate can be avoided without substantially increasing its mass. Further on, the strength of the "magnetic spring," the maximum operating excursion (caused by the maximum nominal current flowing through the at least one voice coil) and the maximum excessive excursion (caused by excessive external acceleration) are decoupled from or are less coupled to the mass and the oscillation behavior of the center magnet system. Hence, the collar in a synergetic way addresses a number of problems when designing an electrodynamic actuator and substantially improves design freedom for the electrodynamic actuator. In summary, at least the following parameters for the electrodynamic actuator are decoupled from or are less coupled to the mass and the oscillation behavior of the center magnet system: flux density, magnetic resistance, magnetic spring, maximum operating excursion, maximum excessive excursion.

Generally an "electrodynamic actuator" transforms electrical power into movement and force. An electrodynamic actuator together with a sound emanating structure forms an "electrodynamic (acoustic) transducer." If the sound emanating structure is a membrane, the electrodynamic actuator together with the membrane forms a "speaker." However, the sound emanating structure may also have a more common shape and for example can also be a housing part of a device, which the electrodynamic actuator is built into (e.g. the device may be an in-ear transducer). Another special embodiment of a sound emanating structure is a display. In this case, an electrodynamic actuator together with a display forms an "output device" (for both audio and video data). Generally, a speaker, an electrodynamic transducer and an output device transform electrical power into sound. Generally, the above devices may also be intended for generation of vibration for haptic feedback.

In one embodiment, the coil arrangement can be connected to the peripheral magnet system part and an airgap can be formed between the coil arrangement and the center magnet system part. In another embodiment, the coil arrangement can be connected to the center magnet system part and an airgap can be formed between the coil arrangement and the peripheral magnet system part. Further on, the center magnet system part or the peripheral magnet system part can be mounted to the sound emanating structure.

A force applied to the sound emanating structure to generate sound may be generated by the inertia of the part of the electrodynamic actuator which is moved in relation to the sound emanating structure (actio-reactio principle) or because the part of the electrodynamic actuator, which is moved in relation to the sound emanating structure, is fixed to another part (e.g. to a housing of a device, which the electrodynamic actuator is built into). So, if the center magnet system part is mounted to the sound emanating structure, sound may be generated by the inertia of the moving peripheral magnet system part or because the peripheral magnet system part is fixed to said another part. Vice versa, in case that the peripheral magnet system part is mounted to the sound emanating structure this means that sound may be generated by the inertia of the moving center magnet system part or because the center magnet system part is fixed to said another part. In this context, it is of advantage if the part of the magnet system, which is intended to be connected to the sound emanating structure, comprises a flat mounting surface, which is designed to be connected to the sound emanating structure.

It should be noted that sound can also emanate from the backside of the sound emanating structure. However, this backside usually faces an interior space of a device (e.g. a mobile phone), which the electrodynamic actuator is built into. Hence, the sound emanating structure may be considered to have the main sound emanating surface and a secondary sound emanating surface (i.e. said backside). Sound waves emanated by the main sound emanating surface directly reach the user's car, whereas sound waves emanated by the secondary sound emanating surface do not directly reach the user's car, but only indirectly via reflection or excitation of other surfaces of a housing the device, which the speaker or output device is built into.

The springs of the spring arrangement can each comprise an annular outer spring area, which is connected to the peripheral magnet system part, and spring arms, which protrude inwards and which are connected to the center magnet system part. However, the spring arms are not necessarily interconnected, but a couple of individual spring arms can form a spring as well.

Generally, the "spring arms" besides the lateral fixation of the magnet system parts and their spring function may additionally act as dampers for the oscillating system. Accordingly, the arms may also be seen and denoted as "damping arms" or "combined spring and damping arms." Generally, the different functions can be influenced by giving the arms a distinct shape and/or by making them of a particular material. A spring arm is not necessarily a straight bar but can be bent in its relaxed state.

The term "annular" in the context of this disclosure generally does not only mean circular rings but also other shapes like ovals and polygons, in particular rectangles. In case of polygons, one should also note that the straight sections of the polygon are not necessarily connected by sharp corners but may also be connected by rounded corners. This definition both relates to the magnet system and the voice coils.

Moreover, the term "annular" in the context of the peripheral magnet system part does not only mean closed rings but also annular arrangements of individual segments forming a ring as a whole. The segments can touch each other, but can also be spaced from one another. This particularly includes straight segments forming the straight sections of a polygon, wherein the segments may be connected or wherein the ends of the segments may be spaced from another.

In one embodiment, the electrodynamic actuator may comprise a frame and/or a housing. A "frame" can hold together a number of the parts of the electrodynamic actuator to form a sub system, which can be the result of an intermediate step in a production process. For example, the frame can directly be connected to the magnet system (e.g. by means of an adhesive). A "housing" can be mounted to the frame and/or to other parts of the electrodynamic actuator and can encompass the back volume of an electrodynamic transducer, i.e. an air or gas compartment behind the sound emanating structure. In common designs, the housing can be hermetically sealed respectively airtight. However, it may also comprise small openings or bass tubes as the case may be. Inter alia by variation of the back volume respectively by provision of openings in the housing, the acoustic performance of the electrodynamic transducer can be influenced.

It is noted that deviations from given numbers defined in the patent claims, which are unavoidable in reality due to technical tolerances, generally shall be covered by those patent claims anyway. In particular, this means that numbers defined in the patent claims are considered to include a range of +/−10% in view of the base value.

Further advantageous embodiments are disclosed in the claims and in the description as well as in the figures.

Advantageously, a height of the collar, which is the extension of the collar in the excursion direction, can be in a range of 0.05 mm to 0.2 mm and/or a width of the collar, which is half the difference of an outer dimension of the collar in a direction perpendicular to an annular course of the collar minus the inner dimension of the collar in said direction, can be in a range of 0.2 mm to 0.6 mm. In this way, the collar provides the aforementioned advantages without influencing the mass of the center magnet part much.

In another advantageous embodiment of the electrodynamic actuator, a height of the collar, which is the extension of the collar in the excursion direction, is in a range of 10% to 100% of the total height of the at least one plate, which is the extension of the at least one plate in said excursion direction, and/or a width of the collar, which is half the difference of an outer dimension of the collar in a direction perpendicular to an annular course of the collar minus the inner dimension of the collar in said direction, is in a range of 2% to 20% of the total width of the at least one plate, which is the extension of the at least one plate in said direction perpendicular to the annular course and/or an area of the collar seen in a direction parallel to the coil axis is in a range of 5% to 80% (in particular in a range of 5% to 50% and more particularly in a range of 5% to 20%) of the total area of the at least one plate seen in said direction. In this way, the collar provides the aforementioned advantages without influencing the mass of the center magnet part much, too.

In one embodiment, the collar is continuous. In this way, the disclosed advantages are obtained on the whole at least one plate. However, in another embodiment, the collar can be broken (i.e. the collar has gaps). In this way, the disclosed advantages are obtained only at sections of the at least one plate, however, with the advantage of a reduced weight of the center magnet system part and other advantages as the case may be.

In a very advantageous embodiment of the electrodynamic actuator, the collar is broken, wherein arms of the spring arrangement are arranged in gaps of the broken collar. Without taking measures, the center magnet system part may hit the spring arrangement and damage the rather fragile spring arms at the maximum excessive excursion caused by excessive external acceleration. But by use of the proposed measures, this potential risk can be avoided and the spring arms can be prevented from being damaged by the center magnet system part.

In a very advantageous embodiment of the electrodynamic actuator, the spring arrangement comprises an annular outer spring area, which is connected to the peripheral magnet system part, and spring arms, which protrude inwards and which are connected to the center magnet system part, wherein the annular outer spring area at least sectionally reaches over the collar. In this way, the spring arms can be prevented from being damaged by the center magnet system part, too, because the center magnet system part hits the spring arrangement at the comparable rigid annular outer spring area and not at the rather fragile spring arms when it is excessively excursed by excessive external acceleration.

Generally, the plate and the peripheral magnet system part can be made from soft iron. In this way, the magnetic flux can be guided in a useful way and magnetic resistances can be kept small.

In various embodiments of the electrodynamic actuator the plate can adjoin the center magnet above or the plate can adjoin the center magnet below or the (first) plate can adjoin the center magnet above and the center magnet system part can comprise another (second) plate, which adjoins said center magnet below in the excursion direction and which comprises a collar on its outer edge (a raised edge area respectively) facing away from the center magnet. The first two embodiments are beneficial in the context of electrodynamic actuators with just one voice coil, whereas the third embodiment is advantageous in the context of electrodynamic actuators with two voice coils where the magnetic flux passes two air gaps and where the disclosed advantages can be provided twice by using the two plates. It should also be noted that the aforementioned embodiments disclosed in the context of the (first) plate and the advantages resulting thereof equally relate to the collar of the second plate.

Beneficially, an average sound pressure level of the electrodynamic transducer or output device measured in an orthogonal distance of 10 cm from the sound emanating surface is at least 50 dB in a frequency range from 100 Hz to 15 kHz. "Average sound pressure level SPLAVG" in general means the integral of the sound pressure level SPL over a particular frequency range divided by said frequency range. In the above context, in detail the ratio between the sound pressure level SPL integrated over a frequency range from f=100 Hz to f=15 kHz and the frequency range from f=100 Hz to f=15 kHz is meant. In a more mathematical language this means $$SPL_{AVG} = \frac{\int_{f=100}^{f=15000} SPL \cdot df}{15000 - 100}$$

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

Like reference numbers refer to like or equivalent parts in the several views.

DETAILED DESCRIPTION OF EMBODIMENTS

Figure 1:
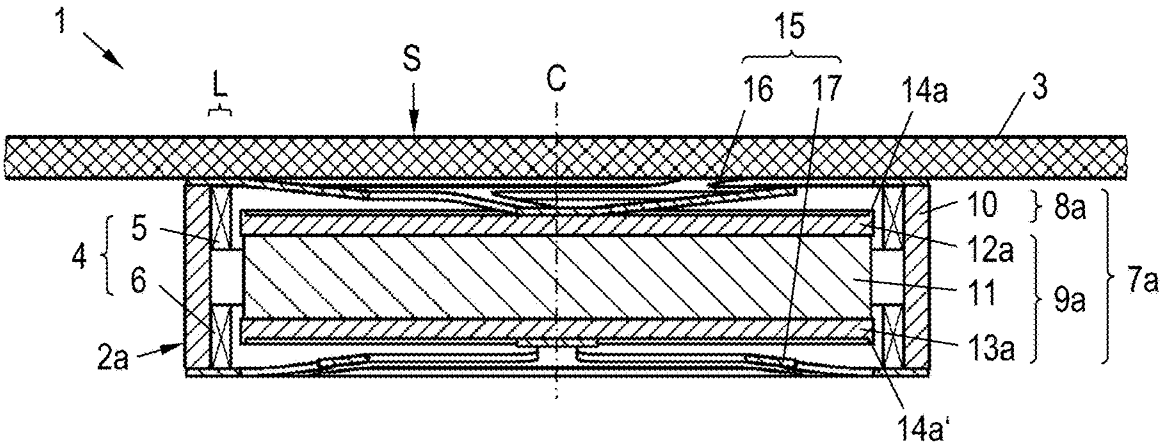
FIG. 1 shows a cross sectional view of an exemplary electrodynamic transducer.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

All directional references (e.g., "plus," "minus," "upper," "lower," "upward," "downward," "left," "right," "leftward," "rightward," "front," "rear," "top," "bottom," "over," "under," "above," "below," "vertical," "horizontal," "clockwise," and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached," "coupled," "connected," and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims. Nevertheless, the term "connected" within the disclosure in particular can mean "direct connection" (without intermediate parts), and the term "couple" within the disclosure in particular can mean "direct or indirect connection" (with or without intermediate parts).

All numbers expressing measurements and so forth used in the specification and claims are to be understood as being modified in all instances by the term "about" or "substantially," which particularly means a deviation of ±10% from a reference value.

Figure 2:
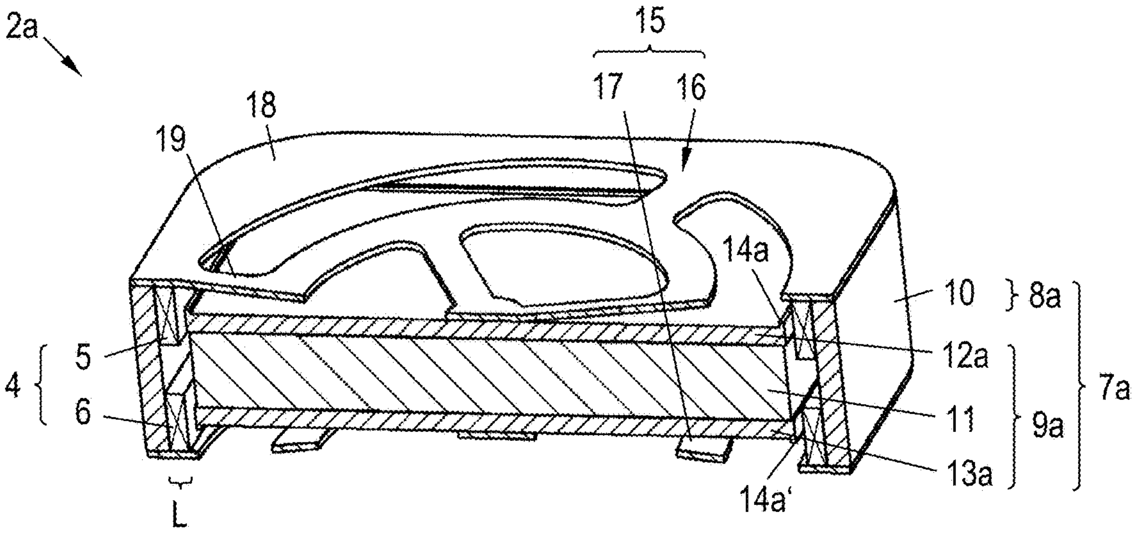
FIG. 2 shows an oblique cross sectional view of the electrodynamic actuator used in the electrodynamic transducer of FIG. 1.
Figure 3:
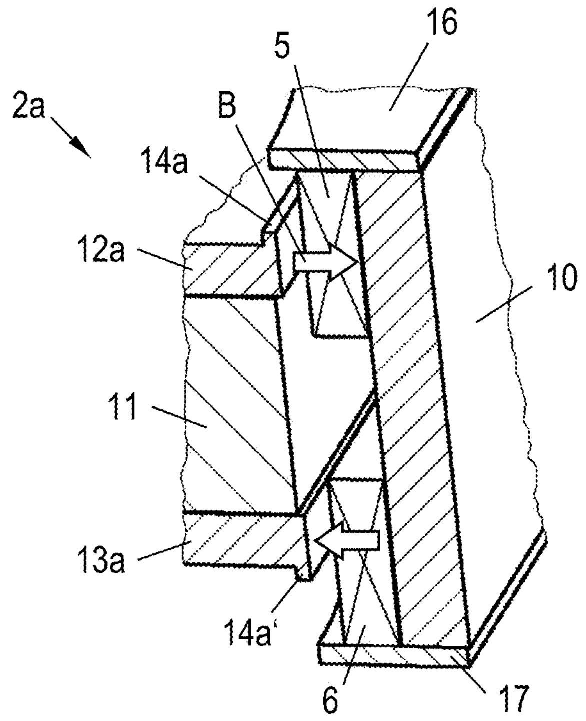
FIG. 3 shows a detailed oblique cross sectional view of the electrodynamic actuator of FIG. 2 in the area of the collars.
Figure 4:
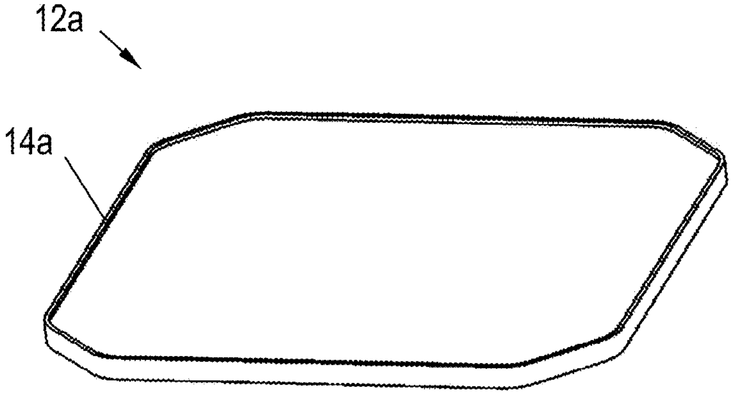
FIG. 4 shows an oblique view of the top plate of the electrodynamic actuator depicted in FIGS. 1 to 3.

FIG. 1 shows a cross sectional view of an exemplary electrodynamic transducer 1, which comprises an electrodynamic actuator 2*a* being connected to a sound emanating structure 3. In addition, FIG. 2 shows an oblique cross sectional view of the electrodynamic actuator 2*a* used in the electrodynamic transducer 1 of FIG. 1, FIG. 3 shows a detailed oblique cross sectional view of the electrodynamic actuator 2*a* of FIG. 2 in the area of the collars 14*a*, 14*a*', and FIG. 4 shows an oblique view of the top plate 12*a* of the electrodynamic actuator 2*a* depicted in FIGS. 1 to 3.

The electrodynamic actuator 2*a* comprises a coil arrangement 4 with two voice coils 5, 6 and a magnet system 7*a* with an annular peripheral magnet system part 8*a* and a center magnet system part 9*a* with the coil arrangement 4 in-between. The two voice coils 5, 6 each have an electrical conductor in the shape of loops running around a coil axis C in a loop section L, and the magnet system 7*a* is designed to generate a magnetic field B transverse to the conductor in the loop section L.

In detail, the peripheral magnet system part 8*a* comprises or is formed of an annular ring body 10. Moreover, the center magnet system part 9*a* comprises a center magnet 11 and a first plate or top plate 12*a* (referenced simply as "first plate 12*a*" hereinafter), which adjoins the center magnet 11 above in the excursion direction, and a second plate or bottom plate 13*a* (referenced simply as "second plate 13*a*" hereinafter), which adjoins said center magnet 11 below in the excursion direction. The first and the second plate 12*a*, 13*a* each comprises a collar 14*a*, 14*a*' on its outer edge (a raised edge area respectively), which faces away from the center magnet 11 in the excursion direction. Accordingly, the first plate 12*a* comprises a collar 14*a* on its outer edge facing upwards, and the second plate 13*a* comprises a collar 14*a*' on its outer edge facing downwards. Generally, the plates 12*a*, 13*a* and the peripheral magnet system part 8*a* can be made from soft iron.

Further on, the electrodynamic actuator 2*a* comprises a spring arrangement 15, which couples the peripheral magnet system part 8*a* to the center magnet system part 9*a* and which allows a relative movement between the peripheral magnet system part 8*a* and said center magnet system part 9*a* in an excursion direction parallel to the coil axis C.

Concretely, the spring arrangement 15 comprises a first spring or top spring 16 (referenced simply as "first spring 16" hereinafter) arranged above the magnet system 7*a* and a second spring or bottom spring 17 (referenced simply as "second spring 17" hereinafter) arranged below the magnet system 7*a*.

In this example, the springs 16, 17 each comprise an annular outer spring area 18, which is connected to the peripheral magnet system part 8*a*, and spring arms 19, which protrude inwards and which are connected to the center magnet system part 9*a*. The particular shape of the springs 16, 17 depicted in FIGS. 1 to 3 is just exemplary and other shapes of springs are applicable as well. It should also be noted that the spring arms 19 are not necessarily interconnected but a couple of individual spring arms 19 can form the first spring 16 and the second spring 17.

For example, the electrodynamic actuator 2*a* can be connected to the sound emanating structure 3 by means of a glue layer or adhesive sheet (not shown in FIG. 1). For this reason, the electrodynamic actuator 2*a* advantageously can comprise a flat mounting surface, for example on the first spring 16, which is intended to be connected to the sound emanating structure 3. In particular, the sound emanating structure 3 has a sound emanating surface S and a backside opposite to the sound emanating surface S, wherein the electrodynamic actuator 2*a* is connected to said backside.

The sound emanating structure 3 can be a passive structure, for example a part of a housing of a device, which the electromagnetic actuator 2*a* is built into. However, the sound emanating structure 3 can also have a special function itself. For example, if the sound emanating structure 3 is embodied as a display, the electrodynamic actuator 2*a* together with the display forms an output device (for both audio and video data). Further on, the sound emanating structure 3 can also be a membrane. In this case, the electrodynamic actuator 2*a* together with the membrane forms a speaker.

In general, a speaker or an electrodynamic transducer 1 (or output device) of the kind disclosed hereinbefore preferably produces an average sound pressure level of at least 50 dB_SPL in a frequency range from 100 Hz to 15 kHz measured in an orthogonal distance of 10 cm from the sound emanating surface S. In particular, the above average sound pressure level is measured at 1 W electrical power and more particularly at the nominal impedance.

It should also be noted at this point that a display forming the sound emanating structure 3 in FIG. 1 may be connected elastically to a housing of the device, which the display is part of. In such a case, the display may be seen as a rigid membrane part of a membrane, wherein the display like a rigid membrane part mainly moves in the piston mode. Accordingly, borders between an electrodynamic transducer 1 and a speaker can blur into one another particularly in such a case.

A force applied to the sound emanating structure 3 to generate sound may be generated by the inertia of the part of the electrodynamic actuator 2*a*, which is moved in relation to the sound emanating structure 3 (which is the center magnet system part 9*a* in FIG. 1), or because the part of the electrodynamic actuator 2*a*, which is moved in relation to the sound emanating structure 3, is fixed to another part (e.g. to a housing of a device, which the electrodynamic actuator 2*a* is built into).

A connection between the sound emanating structure 3 and the electrodynamic actuator 2*a* is not necessarily done on the spring arrangement 15 (here on the first spring 16) but can also be done on the annular ring body 10 or an intermediate part. Moreover, the sound emanating structure 3 can also be connected to the center magnet system part 9*a* what in turn causes the peripheral magnet system part 8*a* being moved in relation to the sound emanating structure 3. In other words, roles of the center magnet system part 9*a* and the peripheral magnet system part 8*a* change in this case.

The term "annular" in the context of the annular peripheral magnet system part 8*a* does not only mean closed rings but also annular arrangements of individual segments forming a ring as a whole. For example, the annular peripheral magnet system part 8*a* may comprise individual segments forming a ring as a whole. The segments may touch each other, but they can also be spaced from one another. In particular, the annular peripheral magnet system part 8*a* may comprise straight segments, wherein the corner region is left out.

Figure 5:
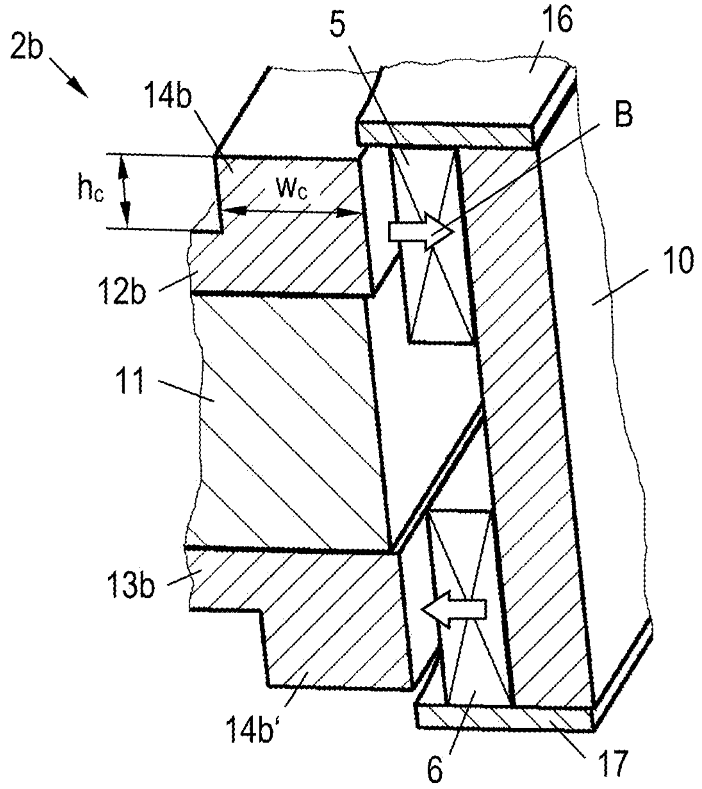
FIG. 5 is like FIG. 3 but with an enlarged collar.
Figure 6:
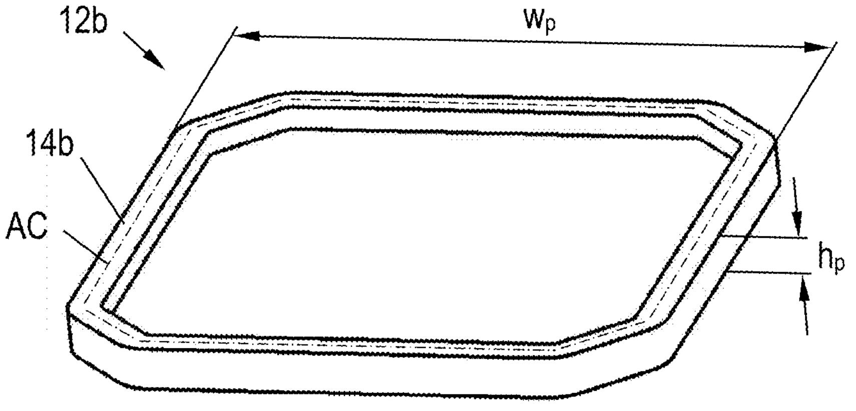
FIG. 6 shows an oblique view of the top plate of the electrodynamic actuator depicted in FIG. 5.

FIGS. 1 to 4 show an embodiment of an electrodynamic actuator 2*a* with comparably small collars 14*a*, 14*a*'. However, this is no binding feature and the collars 14*b*, 14*b*' may also be bigger as this is shown in FIGS. 5 and 6, wherein FIG. 5 shows a detailed oblique cross sectional view of another embodiment of an electrodynamic actuator 2*b* in the area of the collars 14*b*, 14*b*', and FIG. 6 shows an oblique view of the top plate 12*b* of the electrodynamic actuator 2*b* depicted in FIG. 5.

In detail, a favorable height he of the collar 14*a* . . . 14*b*', which is the extension of the collar 14*a* . . . 14*b*' in the excursion direction, is in a range of 0.05 mm to 0.2 mm and/or a width $w_c$ of the collar 14*a* . . . 14*b*', which is half the difference of an outer dimension of the collar 14*a* . . . 14*b*' in a direction perpendicular to an annular course AC of the collar 14*a* . . . 14*b*' minus the inner dimension of the collar 14*a* . . . 14*b*' in said direction, is in a range of 0.2 mm to 0.6 mm.

Alternatively or in addition it is of advantage if a height $h_c$ of the collar 14*a* . . . 14*b*' is in a range of 10% to 100% of the total height $h_p$ of the at least one plate 12*a* . . . 13*b*, which is the extension of the at least one plate 12*a* . . . 13*b* in said excursion direction, and/or the width $w_c$ of the collar 14*a* . . . 14*b*' is in a range of 2% to 20% of the total width $w_p$ of the at least one plate 12*a* . . . 13*b*, which is the extension of the at least one plate 12*a* . . . 13*b* in said direction perpendicular to the annular course AC and/or an area of the collar 14*a* . . . 14*b*' seen in a direction parallel to the coil axis C is in a range of 5% to 80% (in particular in a range of 5% to 50% and more particularly in a range of 5% to 20%) of the total area of the at least one plate 12*a* . . . 13*b* seen in said direction.

By use of the collars 14*a*, 14*a*', at least the following parameters of the electrodynamic actuator 2*a* can be influenced without influencing the mass and the oscillation behavior of the center magnet system part 9*a* much: flux density, magnetic resistance, magnetic spring, maximum operating excursion, maximum excessive excursion.

For example, the height he of the collar 14*a* . . . 14*b*' directly influences the flux density, the magnetic resistance and the reluctance. However, as can be envisaged from FIGS. 1 to 6, the height he also has an influence on the maximum operating excursion (which is caused by a current flowing through the voice coils 5, 6) because out of the magnetic field B the voice coils 5, 6 do not move. Finally, the height he influences the maximum excessive excursion (which is caused by an external acceleration), i.e. the excursion until a movement of the moving part of the electrodynamic actuators 2*a*, 2*b* (which is the center magnet system part 9*a*, 9*b* in the above examples) is blocked. In detail, the center magnet system part 9*a*, 9*b* hits the spring arrangement 15 upon excessive excursion in the above examples. However, a movement of the moving part of the electrodynamic actuator 2*a*, 2*b* may also be blocked by other parts in other embodiments, for example by dedicated stoppers.

Figure 7:
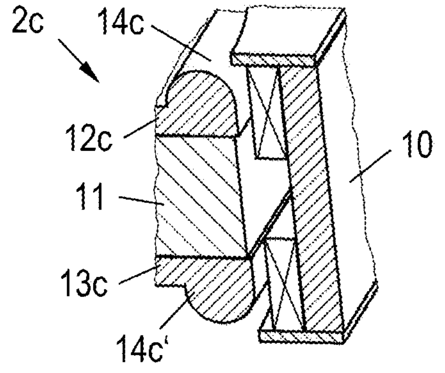
FIGS. 7 to 12 show oblique cross sectional views of electrodynamic actuators having plates with various shapes of collars.
Figure 8:
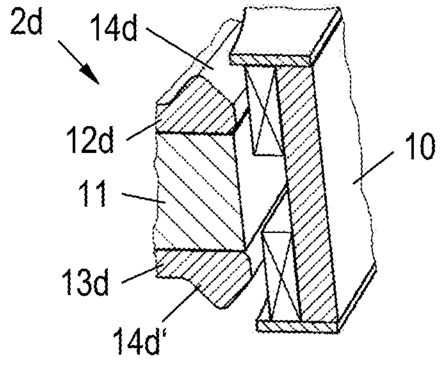
Figure 9:
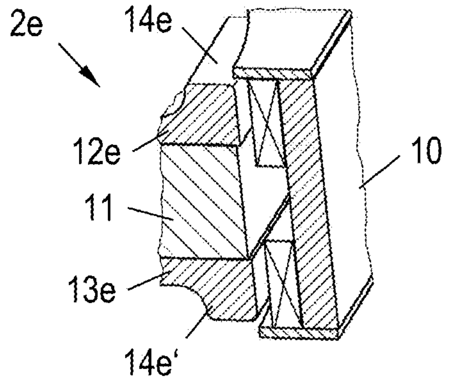
Figure 10:
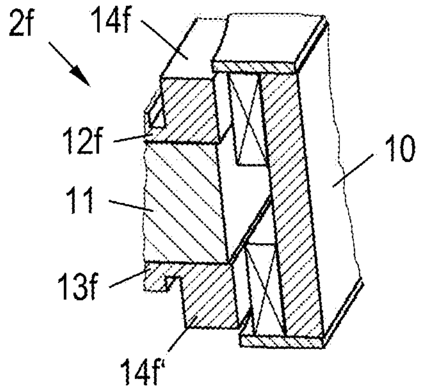
Figure 11:
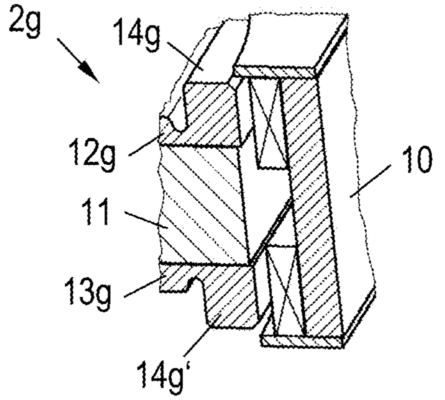
Figure 12:
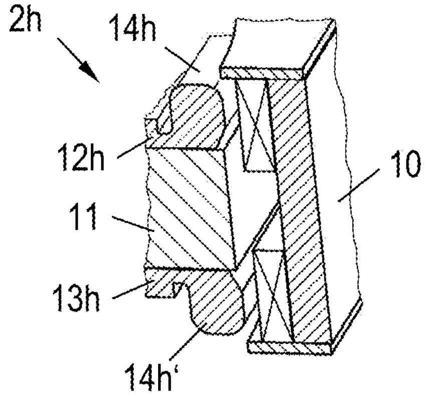
Figure 13:
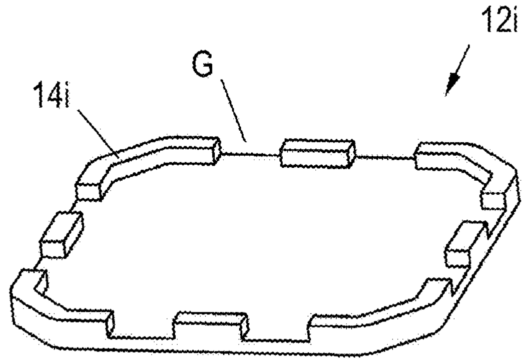
FIGS. 13 to 16 show oblique views of top plates with various shapes of broken collars.
Figure 14:
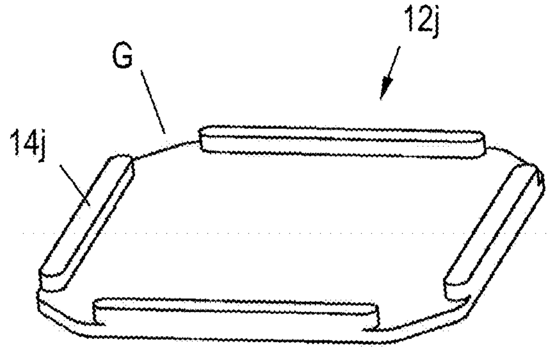
Figure 15:
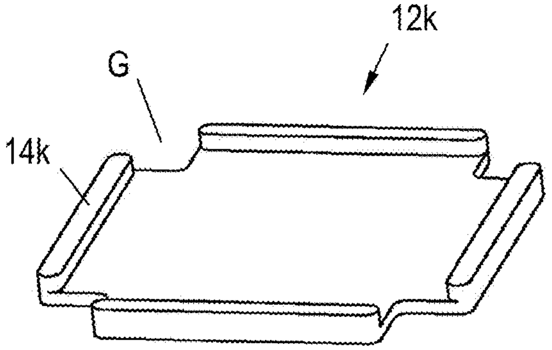

FIGS. 7 to 12 now show various oblique cross sectional views of electrodynamic actuators 2*c* . . . 2*h* having plates 12*c* . . . 13*h* with various shapes of collars 14*c* . . . 14*h*'. In detail, FIG. 7 shows an electrodynamic actuator 2*c* with plates 12*c*, 13*c* with collars 14*c*, 14*c*' having a cross section in the shape of a half circle, FIG. 8 shows an electrodynamic actuator 2*d* with plates 12*d*, 13*d* with collars 14*d*, 14*d*' with a triangular cross section, FIG. 9 shows an electrodynamic actuator 2*e* with plates 12*c*, 13*c* with collars 14*c*, 14*c*' with inner roundings, FIG. 10 shows an electrodynamic actuator 2*f* with plates 12*f*, 13*f* with collars 14*f*, 14*f*' with a square cross section and with inner grooves, FIG. 11 shows an electrodynamic actuator 2*g* with plates 12*g*, 13*g* with collars 14*g*, 14*g*' with a chamfered square cross section and with inner grooves, and FIG. 12 shows an electrodynamic actuator 2*h* with plates 12*h*, 13*h* with collars 14*h*, 14*h*' with a rounded square cross section and with inner grooves. Generally, the shape of the cross section of the collars 14*c* . . . 14*h*' influence the magnetic flux. For example, the grooves concentrate the magnetic flux and roundings smoothen the magnetic flux. By the proposed measures, the design of the collars 14*c* . . . 14*h*' can easily be adapted to the demands when designing an electrodynamic actuator 2*g* . . . 2*h*.

In the examples of FIGS. 1 to 6, the collars 14*a* . . . 14*b*' are continuous. That is why the disclosed advantages are obtained on the whole plates 12*a* . . . 13*b*. However, this is no necessary condition. In this context, FIGS. 13 to 16 show further examples of first plates 12*i* . . . 12*l* with broken collars 14*i* . . . 14*l*, that means with gaps G within the collars 14*i* . . . 14*l*. In this way, the disclosed advantages are obtained only at sections of the plates 12*i* . . . 12*l*, however, with the advantage of a reduced weight of the same and other advantages as the case may be.

Figure 16:
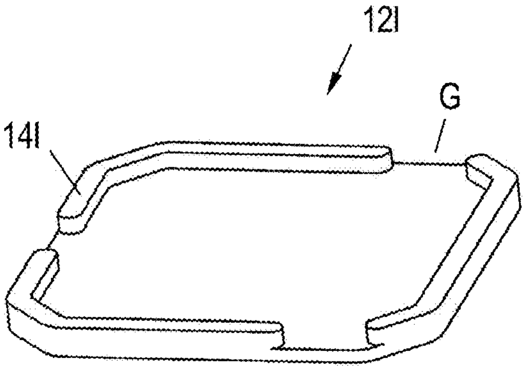
Figure 17:
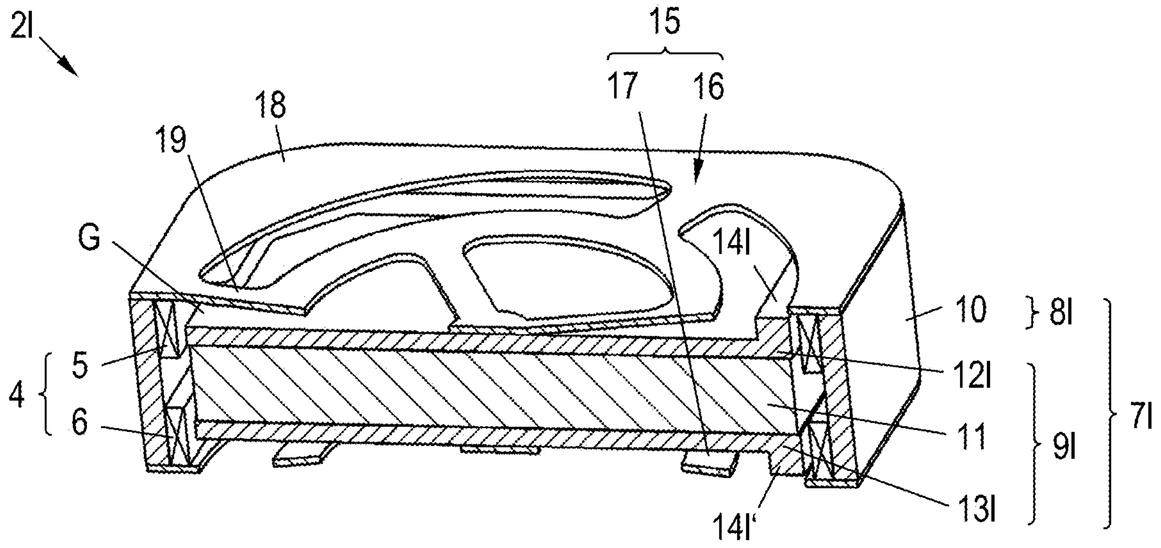
FIGS. 17 shows an oblique cross sectional view of an electrodynamic actuator having plates as depicted in FIG. 16
Figure 18:
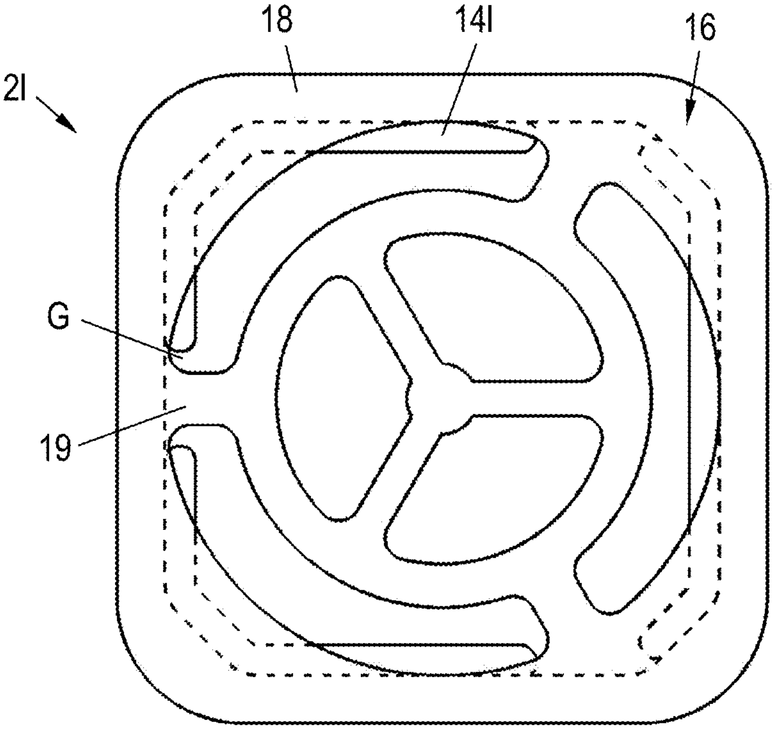
FIG. 18 shows a top view of the electrodynamic actuator of FIG. 17.

In a very advantageous embodiment, arms 19 of the spring arrangement 15 are arranged in the gaps G of the broken collar collars 14*i* . . . 14*l*. In this context, FIGS. 17 and 18 show an example of an electrodynamic actuator 21 which uses the plates 12*l*, 13*l* as depicted in FIG. 16. By use of the proposed measures, the spring arms 19 can be prevented from being damaged by the center magnet system part 9*l* in case it reaches its maximum excessive excursion caused by excessive external acceleration. Instead, the annular outer spring area 18 at least sectionally reaches over the collar 14*l*, 14*l*' and the center magnet system part 9*l* hits the comparably rigid annular outer spring area 18 when it reaches its maximum excessive excursion. However, in another design, the center magnet system part 9*a*, 9*l* may hit another part of the electrodynamic actuator 2*a* . . . 2*l*, for instance, dedicated stoppers.

In the aforementioned examples, the coil arrangement 4 is connected to the peripheral magnet system part 8*a*, 8*l* and an airgap is formed between the coil arrangement 4 and the center magnet system part 9*a*, 9*l*. However, this is no necessary condition, and the coil arrangement 4 may also be connected to the center magnet system part 8*a*, 8*l* wherein an airgap is formed between the coil arrangement 4 and the peripheral magnet system part 8*a*, 8*l*. In this case, the roles of the center magnet system part 9*a*, 9*l* and the peripheral magnet system part 8*a*, 8*l* change in view of their relative movement.

Finally, it is noted that although in the aforementioned examples, the electrodynamic actuator 2*a* . . . 2*l* comprises a first and a second plate 13*a* . . . 13*l*, in other embodiments the electrodynamic actuator 2*a* . . . 2*l* may also comprise just a first plate 10*a* adjoining the center magnet 11 above or below. This advantageous if the disclosed advantages are just needed on one of the top plate 12*a* . . . 12*l* and the bottom plate 13*a* . . . 13*l* or if the coil arrangement 4 comprises just one voice coil 5 or 6.

One should also note that the cross section of a collar 14*a* . . . 14*l*' is independent of whether it is continuous or broken. In particular, this means that the examples shown in FIGS. 1 to 12 may be used in any combination with the examples shown in FIGS. 13 to 16.

Generally, it should also be noted that the disclosed collar 14*a* . . . 14*l*' is not bound to a particular shape of the electrodynamic actuator 2*a* . . . 2*l*, but various other shapes are possible as well. For example, the electrodynamic actuator 2*a* . . . 2*l* instead of having a square footprint may also have a general polygonal shape or may be circular or oval. Polygonal shapes do also include polygons with rounded corners. Moreover, the disclosed collar 14*a* . . . 14*l*' is not bound to a particular shape of the springs 16, 17 and the voice coils 5, 6. Instead, springs 16, 17 with different shape and number and voice coils 5, 6 with different shape and number may be used in the context of the disclosed collar 14*a* . . . 14*l*' as well.

Finally it is noted that the scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

LIST OF REFERENCES

1 electrodynamic transducer
2*a* . . . 2*l* electrodynamic actuator
3 sound emanating structure
4 coil arrangement
5 first (upper) voice coil
6 second (lower) voice coil
7*a*, 7*l* magnet system
8*a*, 8*l* peripheral magnet system part
9*a*, 9*l* center magnet system part
10 outer ring
11 center magnet
12*a* . . . 12*l* first (top) plate
13*a* . . . 13*l* second (bottom) plate
14*a* . . . 14*l*' collar
15 spring arrangement
16 first (upper) spring
17 second (lower) spring
18 outer spring area
19 spring arm
$h_c$ height of collar
$h_p$ total height of plate
$w_c$ width of collar
$w_p$ total width of plate
AC annular course of collar
B magnetic field
C coil axis
G gap in collar
L loop section
S sound emanating surface

What is claimed is:

1. An electrodynamic actuator, designed to be connected to a sound emanating structure, comprising:

a coil arrangement with at least one voice coil, which has an electrical conductor in the shape of loops running around a coil axis in a loop section;

a magnet system, comprising an annular peripheral magnet system part and a center magnet system part with the coil arrangement in-between, wherein the magnet system is designed to generate a magnetic field transverse to the conductor in the loop section; and a spring arrangement coupling the peripheral magnet system part to the center magnet system part and allowing a relative movement between the peripheral magnet system part and said center magnet system part in an excursion direction parallel to the coil axis, wherein the center magnet system part comprises a center magnet and at least one plate adjoining said center magnet in the excursion direction, characterized in that the at least one plate comprises a collar on its outer edge, which faces away from the center magnet in the excursion direction.

2. The electrodynamic actuator as claimed in claim 1, wherein:

a height of the collar, which is the extension of the collar in the excursion direction, is in a range of 0.05 mm to 0.2 mm, and/or a width of the collar, which is half the difference of an outer dimension of the collar in a direction perpendicular to an annular course of the collar minus the inner dimension of the collar in said direction, is in a range of 0.2 mm to 0.6 mm.

3. The electrodynamic actuator as claimed in claim 1, wherein;

a height of the collar, which is the extension of the collar in the excursion direction, is in a range of 10% to 100% of the total height of the at least one plate, which is the extension of the at least one plate in said excursion direction, and/or a width of the collar, which is half the difference of an outer dimension of the collar in a direction perpendicular to an annular course of the collar minus the inner dimension of the collar in said direction, is in a range of 2% to 20% of the total width of the at least one plate, which is the extension of the at least one plate in said direction perpendicular to the annular course, and/or an area of the collar seen in a direction parallel to the coil axis is in a range of 5% to 80% of the total area of the at least one plate seen in said direction.

4. The electrodynamic actuator as claimed in claim 1, wherein the collar is continuous or broken.

5. The electrodynamic actuator as claimed in claim 1, wherein the collar is broken and wherein arms of the spring arrangement are arranged in gaps of the broken collar.

6. The electrodynamic actuator as claimed in claim 1, wherein the spring arrangement comprises an annular outer spring area, which is connected to the peripheral magnet system part, and spring arms, which protrude inwards and which are connected to the center magnet system part, wherein the annular outer spring area at least sectionally reaches over the collar.

7. The electrodynamic actuator as claimed in claim 1, wherein:

the coil arrangement is connected to the peripheral magnet system part and an airgap is formed between the coil arrangement and the center magnet system part, or the coil arrangement is connected to the center magnet system part and an airgap is formed between the coil arrangement and the peripheral magnet system part.

8. The electrodynamic actuator as claimed in claim 1, wherein the plate and the peripheral magnet system part are made from soft iron.

9. The electrodynamic actuator as claimed in claim 1, wherein:

the plate adjoins the center magnet above, or the plate adjoins the center magnet below, or the plate adjoins the center magnet above and wherein the center magnet system part comprises another plate, which adjoins said center magnet below in the excursion direction and which comprises a collar on its outer edge facing away from the center magnet.

10. An electrodynamic transducer, comprising a sound emanating structure and an electrodynamic actuator according to claim 1, which is connected to the sound emanating structure.

11. The electrodynamic transducer as claimed in claim 10, wherein an average sound pressure level of the electrodynamic transducer measured in an orthogonal distance of 10 cm from the sound emanating surface is at least 50 dB sound pressure level in a frequency range from 100 Hz to 15 kHz.

12. The electrodynamic transducer as claimed in claim 10, wherein the sound emanating structure is embodied as a membrane, as a display or as a housing part of a device, which the electrodynamic actuator is built into.

13. An electrodynamic actuator, designed to be connected to a sound emanating structure, comprising:

a coil arrangement with at least one voice coil, which has an electrical conductor in the shape of loops running around a coil axis in a loop section;

a magnet system, comprising an annular peripheral magnet system part and a center magnet system part with the coil arrangement in-between, wherein the magnet system is designed to generate a magnetic field transverse to the conductor in the loop section; and a spring arrangement coupling the peripheral magnet system part to the center magnet system part and allowing a relative movement between the peripheral magnet system part and said center magnet system part in an excursion direction parallel to the coil axis, wherein the center magnet system part comprises a center magnet and at least one plate adjoining said center magnet in the excursion direction, characterized in that the at least one plate comprises a collar on its outer edge, which faces away from the center magnet in the excursion direction, and wherein the collar is broken and arms of the spring arrangement are arranged in gaps of the broken collar.

14. The electrodynamic actuator as claimed in claim 13, wherein:

a height of the collar, which is the extension of the collar in the excursion direction, is in a range of 0.05 mm to 0.2 mm, and/or a width of the collar, which is half the difference of an outer dimension of the collar in a direction perpendicular to an annular course of the collar minus the inner dimension of the collar in said direction, is in a range of 0.2 mm to 0.6 mm.

15. The electrodynamic actuator as claimed in claim 13, wherein:

a height of the collar, which is the extension of the collar in the excursion direction, is in a range of 10% to 100% of the total height of the at least one plate, which is the extension of the at least one plate in said excursion direction, and/or a width of the collar, which is half the difference of an outer dimension of the collar in a direction perpendicular to an annular course of the collar minus the inner dimension of the collar in said direction, is in a range of 2% to 20% of the total width of the at least one plate, which is the extension of the at least one plate in said direction perpendicular to the annular course, and/or an area of the collar seen in a direction parallel to the coil axis is in a range of 5% to 80% of the total area of the at least one plate seen in said direction.

16. The electrodynamic actuator as claimed in claim 13, wherein the spring arrangement comprises an annular outer spring area, which is connected to the peripheral magnet system part, and spring arms, which protrude inwards and which are connected to the center magnet system part, wherein the annular outer spring area at least sectionally reaches over the collar.

17. The electrodynamic actuator as claimed in claim 13, wherein:

the coil arrangement is connected to the peripheral magnet system part and an airgap is formed between the coil arrangement and the center magnet system part, or the coil arrangement is connected to the center magnet system part and an airgap is formed between the coil arrangement and the peripheral magnet system part.

18. The electrodynamic actuator as claimed in claim 13, wherein the plate and the peripheral magnet system part are made from soft iron.

19. The electrodynamic actuator as claimed in claim 13, wherein:

the plate adjoins the center magnet above, or the plate adjoins the center magnet below, or the plate adjoins the center magnet above and wherein the center magnet system part comprises another plate, which adjoins said center magnet below in the excursion direction and which comprises a collar on its outer edge facing away from the center magnet.

20. An electrodynamic transducer, comprising a sound emanating structure and an electrodynamic actuator according to claim 13, which is connected to the sound emanating structure.

* * * * *